J. C. W. SCHOPKE.
STRAINER.
APPLICATION FILED MAY 16, 1913.
1,081,469.
Patented Dec. 16, 1913.
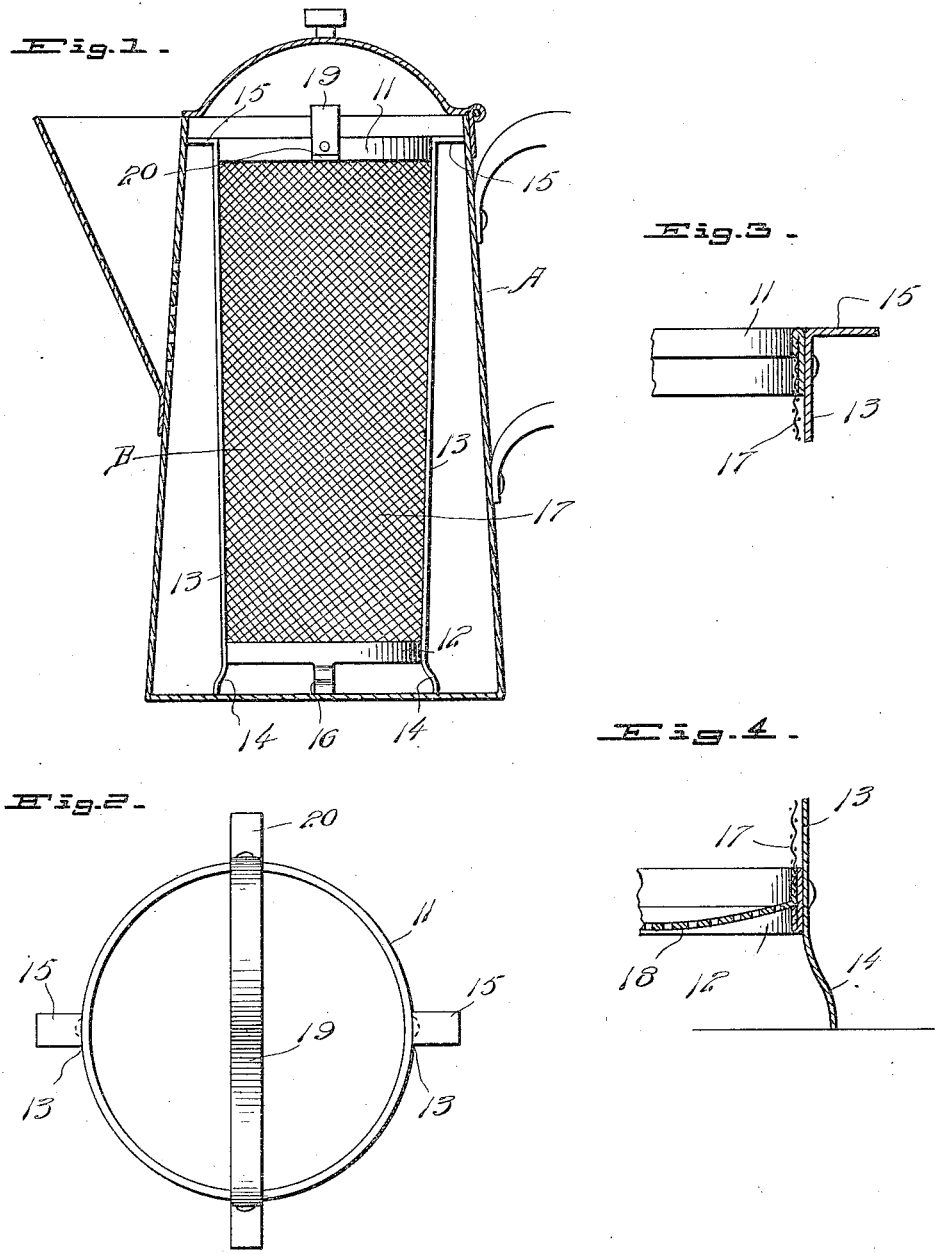
Witnesses
Chas. E. Kumpus,
Henry T. Bright
Inventor
J. C. W. Schopke.
By
Attorneys

UNITED STATES PATENT OFFICE.

JOHN C. W. SCHOPKE, OF LENNOX, SOUTH DAKOTA.

STRAINER.

1,081,469.  Specification of Letters Patent.  Patented Dec. 16, 1913.

Application filed May 16, 1913. Serial No. 768,161.

*To all whom it may concern:*

Be it known that I, JOHN C. W. SCHOPKE, residing at Lennox, in the county of Lincoln, State of South Dakota, have invented certain new and useful Improvements in Strainers; and I do hereby declare the following to be a full, clear, and exact description of the invention, such as will enable others skilled in the art to which it appertains to make and use the same.

This invention relates to strainers and particularly to a type adapted for use in connection with a boiling pot in the production of tea and coffee.

The object of the invention resides in the provision of a strainer of the character named which will be simple in construction, efficient in use and which may be easily applied to and detached from a boiling pot.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a vertical section of a coffee pot having the improved strainer associated therewith; Fig. 2, a plan view of the strainer detached; Fig. 3, an enlarged transverse section through the upper ring of the strainer, and Fig. 4, an enlarged transverse section through the lower ring of the strainer.

Referring to the drawings A indicates a coffee pot of the usual and well known construction.

The improved strainer is indicated generally at B and includes an upper ring 11 and a lower ring 12, the latter being of slightly less diameter than the former. The rings 11 and 12 are connected together by bars 13 the lower ends of which are extended beyond the lower ring 12 to form legs 14 while the upper ends thereof are bent laterally at right angles as at 15, the free end of the laterally bent portions 15 being adapted to engage the inner face of the side wall of the pot so as to hold the strainer against lateral movement when same is disposed within the pot. The lower ring 12 has formed integral therewith legs 16 which in conjunction with the legs 14 support the strainer upon the bottom of the pot A. The lower edge of the ring 12 between the legs 16 is turned inwardly and crimped upon the lower end of the side wall 17 of the strainer which side wall is constructed of a suitable foraminous material. Supported upon the free end of the inturned lower edge of the ring 12 is a bottom 18 which is formed of a dished perforated plate. The upper edge of the ring 11 is also inturned and crimped upon the upper end of the side wall 17. Connected to the ring 11 at diametrically opposite points is a bail 19 the terminals of which are directed laterally as at 20 and serve the same function as the laterally bent upper ends of the bars 13.

By reason of the fact that the lower ring 12 is of less diameter than the upper ring 11 it will be apparent that the foraminous side wall 17 will taper from its upper to its lower end so that when the strainer is inverted no difficulty will be experienced in discharging the ground material or leaves therefrom as the case may be.

When the beverage has been made the strainer is lifted from the pot A by means of the bail 19 and the possibilty of the strength of the beverage varying during use obviated.

What I claim is:—

A strainer of the class described comprising upper and lower rings the latter being of less diameter than the former, a side wall of foraminous material, the upper edge of the upper ring being inturned and crimped upon the upper end of the side wall and the lower edge of the lower ring inturned and crimped upon the lower end of the side wall, legs formed integral with the lower ring, bars connecting the upper and lower rings and having their lower ends extended beyond the lower ring to form legs and their upper ends bent laterally, and a bail secured to the upper ring and having its ends directed laterally.

In testimony whereof, I affix my signature, in the presence of two witnesses.

JOHN C. W. SCHOPKE.

Witnesses:
E. C. HOFMEISTER,
C. A. RAKER.

Copies of this patent may be obtained for five cents each, by addressing the "Commissioner of Patents, Washington, D. C."